United States Patent
Eilers et al.

(10) Patent No.: US 7,018,531 B2
(45) Date of Patent: Mar. 28, 2006

(54) ADDITIVE DISPENSING CARTRIDGE FOR AN OIL FILTER, AND OIL FILTER INCORPORATING SAME

(75) Inventors: Derek Eilers, Denver, CO (US); Daniel J. Auxter, Perrysburg, OH (US); Michael S. Lynch, Fostoria, OH (US); Gerard W. Bilski, Perrysburg, OH (US); Gary B. Zulauf, Findlay, OH (US)

(73) Assignee: Honeywell International Inc., Morristown, NJ (US)

( * ) Notice: Subject to any disclaimer, the term of this patent is extended or adjusted under 35 U.S.C. 154(b) by 171 days.

(21) Appl. No.: 10/352,344

(22) Filed: Jan. 27, 2003

(65) Prior Publication Data
US 2003/0111398 A1 Jun. 19, 2003

Related U.S. Application Data (63) Continuation-in-part of application No. 09/867,973, filed on May 30, 2001.

(51) Int. Cl.
 *B65B 1/04* (2006.01)

(52) U.S. Cl. ............... 210/205; 210/206; 210/209; 210/266; 210/282; 210/287; 210/416.5; 210/DIG. 17; 210/767; 141/2

(58) Field of Classification Search ............ 210/205, 210/206, 209, 266, 282, 287, 416.5, DIG. 17, 210/767; 141/2
See application file for complete search history.

(56) References Cited

U.S. PATENT DOCUMENTS

| | | | |
|---|---|---|---|
| 2,262,526 A | 11/1941 | Fairlie et al. | |
| 2,310,305 A | 2/1943 | Miller et al. | |
| 2,618,586 A | 11/1952 | Hendel | |
| 3,336,223 A | 8/1967 | Kneeland | |
| 4,075,097 A | 2/1978 | Paul | |
| 4,075,098 A | 2/1978 | Paul et al. | |

(Continued)

FOREIGN PATENT DOCUMENTS

| | | |
|---|---|---|
| DE | DD157197 | 10/1982 |
| DE | 4200376 A1 | 7/1993 |
| EP | 0416905 A2 | 3/1991 |
| EP | 0416908 A2 | 3/1991 |

(Continued)

OTHER PUBLICATIONS

International Search Report dated Jun. 3, 2004, International Application No. PCT/US2004/002144.
Written Opinion of International Searching Authority dated Jun. 3, 2004, International Application No. PCT/US2004/002144.

*Primary Examiner*—Duane Smith
*Assistant Examiner*—Minh-Chau T. Pham (57) ABSTRACT

An oil-conditioning filter, for use with an internal combustion engine, includes a mechanical filter element and a central additive cartridge, for gradually dispensing an oil additive over time. The additive cartridge has a beneficial oil-conditioning agent contained therein. The additive may be provided as a solid block within a storage chamber of the cartridge, or may be a plurality of pellets. Central placement of the cartridge allows for fluid filtration through the mechanical filter element before the additive is added thereto, reducing the likelihood that the additive will be filtered out prematurely upon its initial release. An additive cartridge for installation in an oil filter is also described, including a baffle portion and a storage chamber. Alternative exemplary embodiments of the additive cartridge may include a cylindrical shell, a basket which is operatively attached to an oil filter center tube, or a porous center tube.

18 Claims, 8 Drawing Sheets

U.S. PATENT DOCUMENTS

| | | | |
|---|---|---|---|
| 4,113,606 A | | 9/1978 | Mulaskey |
| 4,144,166 A | * | 3/1979 | DeJovine .................. 508/117 |
| 4,144,169 A | | 3/1979 | Grueschow |
| 4,168,225 A | | 9/1979 | Jackson |
| 4,211,639 A | | 7/1980 | Jackson |
| 4,265,748 A | | 5/1981 | Villani et al. |
| 4,523,532 A | | 6/1985 | Moriarty et al. |
| 4,557,829 A | | 12/1985 | Fields |
| 4,660,645 A | | 4/1987 | Newlove et al. |
| 4,751,901 A | * | 6/1988 | Moor .................... 123/196 A |
| 4,755,289 A | | 7/1988 | Villani |
| 4,886,599 A | | 12/1989 | Bachmann et al. |
| 4,888,122 A | * | 12/1989 | McCready .................. 508/165 |
| 4,895,640 A | | 1/1990 | Jackson |
| 4,902,408 A | | 2/1990 | Reichert et al. |
| 4,906,389 A | | 3/1990 | Brownawell et al. |
| 5,032,259 A | | 7/1991 | He et al. |
| 5,042,617 A | | 8/1991 | Brownawell et al. |
| 5,057,368 A | | 10/1991 | Largman et al. |
| 5,069,799 A | | 12/1991 | Brownawell et al. |
| 5,069,970 A | | 12/1991 | Largman et al. |
| 5,094,747 A | | 3/1992 | Johnson |
| 5,199,978 A | | 4/1993 | Poirier et al. |
| 5,209,842 A | * | 5/1993 | Moor ........................ 210/168 |
| 5,225,081 A | | 7/1993 | Brownawell |
| 5,472,875 A | | 12/1995 | Monticello |
| 5,478,463 A | | 12/1995 | Brownawell et al. |
| 5,527,452 A | | 6/1996 | Grigoriev et al. |
| 5,552,040 A | | 9/1996 | Baehler et al. |
| 5,591,330 A | | 1/1997 | Lefebvre |
| 5,704,966 A | | 1/1998 | Rohrbach et al. |
| 5,713,971 A | | 2/1998 | Rohrbach et al. |
| 5,718,258 A | | 2/1998 | Lefebvre et al. |
| 5,725,031 A | | 3/1998 | Bilski et al. |
| 5,741,433 A | | 4/1998 | Mitchell et al. |
| 5,744,236 A | | 4/1998 | Rohrbach et al. |
| 5,759,394 A | | 6/1998 | Rohrbach et al. |
| 5,891,221 A | | 4/1999 | Rohrbach et al. |
| 5,900,153 A | | 5/1999 | Sanford |
| 5,902,384 A | | 5/1999 | Rohrbach et al. |
| 5,942,323 A | | 8/1999 | England |
| 5,948,248 A | | 9/1999 | Brown |
| 5,951,744 A | | 9/1999 | Rohrbach et al. |
| 6,004,381 A | | 12/1999 | Rohrbach et al. |
| 6,045,692 A | | 4/2000 | Bilski et al. |
| 6,048,614 A | | 4/2000 | Rohrbach et al. |
| 6,117,802 A | | 9/2000 | Rohrbach et al. |
| 6,126,823 A | | 10/2000 | Soderlund et al. |
| 6,127,036 A | | 10/2000 | Xue et al. |
| 6,129,835 A | | 10/2000 | Lesieur et al. |
| 6,235,519 B1 | | 5/2001 | Wang et al. |
| 6,238,554 B1 | | 5/2001 | Martin, Jr. et al. |
| RE37,369 E | | 9/2001 | Hudgens et al. |
| 6,379,564 B1 | | 4/2002 | Rohrbach et al. |
| 6,639,034 B1 | | 10/2003 | Sivik et al. |
| 6,743,759 B1 | | 6/2004 | Stunkel et al. |
| 6,774,091 B1 | | 8/2004 | Dituro et al. |
| 6,843,916 B1 | | 1/2005 | Burrington et al. |
| 2002/0002118 A1 | | 1/2002 | Brandt |
| 2002/0136936 A1 | | 9/2002 | Grieve et al. |
| 2003/0119682 A1 | | 6/2003 | Saini et al. |
| 2003/0158051 A1 | | 8/2003 | Karol et al. |
| 2004/0058830 A1 | | 3/2004 | Kan et al. |
| 2004/0102335 A1 | | 5/2004 | Carrick et al. |
| EP | | 1061251 A2 | 12/2000 |
| EP | | 1061251 A3 | 6/2001 |
| FR | | 2330856 | 6/1997 |
| GB | | 203354 | 9/1923 |
| GB | | 904480 | 8/1962 |
| RU | | 1776423 A1 | 11/1992 |
| SU | | 572072 | 4/1980 |
| WO | | WO 94/11556 | 5/1994 |
| WO | | WO 01/62871 A1 | 8/2001 |
| WO | | WO 02/096534 A1 | 12/2002 |

* cited by examiner

ADDITIVE DISPENSING CARTRIDGE FOR AN OIL FILTER, AND OIL FILTER INCORPORATING SAME

CROSS-REFERENCE TO RELATED APPLICATIONS

The present application is a continuation-in-part of application Ser. No. 09/867,973, filed May 30, 2001, and published as US 2002/0014447, the disclosure of which is incorporated by reference herein.

BACKGROUND OF THE INVENTION

1. Field of the Invention

The present invention relates to an additive dispensing cartridge for an oil filter assembly, and to an oil filter incorporating the cartridge. More particularly, the present invention relates to an additive dispensing cartridge containing a beneficial additive composition, and to an oil filter having a centrally located additive dispenser incorporated therein. Even more particularly, the present invention relates to an oil filter in which a centrally located additive dispenser, containing one or more oil-conditioning compounds therein, is operable to slowly release the oil conditioning compounds, over time, into filtered engine oil on the downstream, or 'clean' side of the mechanical filter element.

2. Description of the Background Art

Many different types of fluid filters are known. Most such filters use a mechanical or 'screening' type of filtration, with a replaceable cartridge having a porous filter element therein, through which the oil is repeatedly cycled to remove impurities.

In the oil filtration art, it is well known that normal operation of an internal combustion engine, particularly a diesel engine, results in the formation of contaminants. These contaminants include, among others, soot, which is formed from incomplete combustion of the fossil fuel, and acids that result from combustion. These contaminants are typically introduced into the lubricating oil during engine operation, and tend to increase oil viscosity and generate unwanted engine deposits, leading to increased engine wear.

The conventional solution to these problems has been to place various additives into lubricating oils, during their initial formulation. In order to combat soot-related problems, many conventional lubricating oils include dispersants that resist agglomeration of soot therein. These work well for a short period, but may become depleted. Additionally, due to the solubility and chemical stability limits of these dispersants in the oil, the service lives of the lubricating oil and the oil filter are less than optimal.

In order to counteract the effects of acidic combustion products, many conventional motor oils include neutralizing additives known as over-based detergents. These are a source of TBN (total base number), which is a measure of the quantity of the over-based detergent in the oil. The depletion of the TBN is an important limiting factor for many internal combustion engines, and in particular for heavy-duty applications with diesel engines.

In order to improve engine protection and to combat other problems, conventional lubricating oils often include one or more further additives, which may be corrosion inhibitors, antioxidants, friction modifiers, pour point depressants, detergents, viscosity index improvers, anti-wear agents, and/or extreme pressure additives. The inclusion of these further additives may be beneficial; however, with conventional methods, the amount and concentration of these additives are limited by the ability of lubricating oils to suspend these additives, as well as by the chemical stability of these additives in the oil. Examples of oil filters which include extra additives for the oil include U.S. Pat. Nos. 4,075,097, 4,144,169, 5,591,330, 5,725,031, and 6,045,692.

An oil filter including a central receptacle for holding and dispensing a solid lubricant in powdered form is disclosed in U.S. Pat. No. 5,032,259 to He et al.

Other solutions have been proposed in addition to the conventional method of mixing additives with lubricating oil. For example, in order to combat the buildup of sludge in oil, U.S. Pat. No. 5,042,617, issued in 1991 to Brownawell, and entitled Method of Reducing the Presence of Sludge in Lubricating Oils; and U.S. Pat. No. 5,478,463, issued in 1995 to Brownawell et al, and entitled Method of Reducing Sludge and Varnish Precursors in Lubricating Oil, each disclose an oil filter and method for reducing the amount of sludge in lubricating oil as it circulates through an engine. These Brownawell patents provide for the inclusion of particles in an oil filter that are oil insoluble and oil wettable, and which complex with sludge, such that at least some of the sludge that these particles come into contact with is immobilized on the particles. The Brownawell '617 patent discloses the inclusion of oil insoluble and oil wettable particles in an oil filter that are retained on a divided substrate, whereas the Brownawell '463 patent discloses the inclusion of such particles that are not retained on a substrate, but are nonetheless retained in the oil filter.

Another Brownawell patent, which relates to the reduction of combustion acids in lubricating oil, is U.S. Pat. No. 5,069,799 issued in 1991 and entitled Method For Rejuvenating Lubricating Oils. This patent discloses an oil filter and method for reducing the amount of combustion acids in lubricating oil. In particular, it discloses a method of rejuvenating lubricating oil, which includes reduction of combustion acids, by serially passing the oil through first a chemically active filter media, then a physically active filter media, and finally an inactive filter media. In this '799 patent, the chemically active filter media includes a strong base, to displace weak bases that have combined with combustion acids. The combustion acid and the strong base then combine to form a salt, which is then physically trapped by subsequent mechanical filter media.

U.S. Pat. No. 5,225,081 to Brownawell discloses method of removing polynuclear aromatics from used lubricating oil. The method of the Brownawell '081 reference involves passing oil through a staged oil filter system, which may include a chemically active filter media. The chemically active filter media is made of a composite material including particles of an active component and a thermoplastic binder, which are a product of a heated extrusion process. Basic conditioners are given as one example of materials suitable for use as chemically active filter media. Activated carbon is also emphasized as a preferred component of the filter media in this reference.

Some designs for multiple stage oil filters are known, such as those disclosed in U.S. Pat. Nos. 4,557,829 and 4,886,599. U.S. Pat. No. 4,886,599 to Bachmann et al. discloses a filter cartridge with sequential concentric cylindrical filter elements, for both chemical and mechanical filtration of oil contained in an oil-sealed vacuum pump.

Other designs for oil filters that contain extra additives and dispense those additives into oil, over time, are disclosed in U.S. Pat. Nos. 5,552,040, and 5,591,330. Some designs are also known for heavy duty coolant filters which release additives over time, such as those disclosed in U.S. Pat. Nos. RE 37,369, 5,741,433, and 5,948,248.

U.S. Pat. No. 6,238,554 to Martin, Jr. et al discloses a fuel filter including an inner housing assembly containing a soluble fuel additive composition.

While the known filters are usable for their intended purposes, the release of supplemental additives from the known filters often takes place either immediately after installation or more rapidly than is needed for protecting the oil. Subsequently, after some time has elapsed, there may be little or no additive left in the filter.

Another problem with many of the known filter designs is that beneficial additives are added to the oil before the oil is mechanically filtered through a filter element. As a result, when the oil is mechanically filtered, some of the beneficial additives that have just been added may be immediately filtered out.

A need still exists in the art for an improved oil filter having a beneficial oil additive incorporated therein, which additive is slowly released over the useful life of the filter. A need also exists for an improved oil filter which could extend the useful life of engine oil, so as to allow a user to extend the time interval between oil changes in a vehicle, particularly a vehicle having a diesel engine.

SUMMARY OF THE INVENTION

The present invention provides an improved oil filter, having a basic conditioner and/or another beneficial additive incorporated therein. In the practice of the present invention, the beneficial additive is housed within a centrally located additive dispenser cartridge, which is operable to dispense an additive composition into relatively clean filtered oil that has already passed through a mechanical filter element.

In a particular embodiment of the invention, the additive chamber includes an additive cartridge which is a hollow shell, and a beneficial additive contained within the housing. The additive chamber is located inside of the mechanical filter element at a central part of the filter, so that the oil has already been mechanically filtered when additive is added thereto.

The apparatus according to the invention may also include a baffle for directing oil flow, and the additive cartridge may be attached to the baffle. Where the baffle is used, a dividing wall may be provided between the baffle and the additive chamber.

The additive cartridge has at least one opening, and may have a limited number of openings therein to control the rate of diffusion therefrom.

Accordingly, it is an object of the present invention to provide an improved oil filter including one or more beneficial oil additives that are released slowly over the life of the filter.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Throughout the present specification, relative positional terms like 'upper', 'lower', 'top', 'bottom', 'horizontal', 'vertical', and the like are used to refer to the filter and components in the orientation thereof shown in the drawings. These terms are used in an illustrative sense to describe the depicted embodiments, and are not meant to be limitative. It will be understood that in a specific application thereof, a filter may be installed on an engine in an orientation different from that shown in the drawings, such as inverted 180 degrees or transverse to that shown, and in such a case, the above-identified relative positional terms will no longer be accurate.

Figure 1:
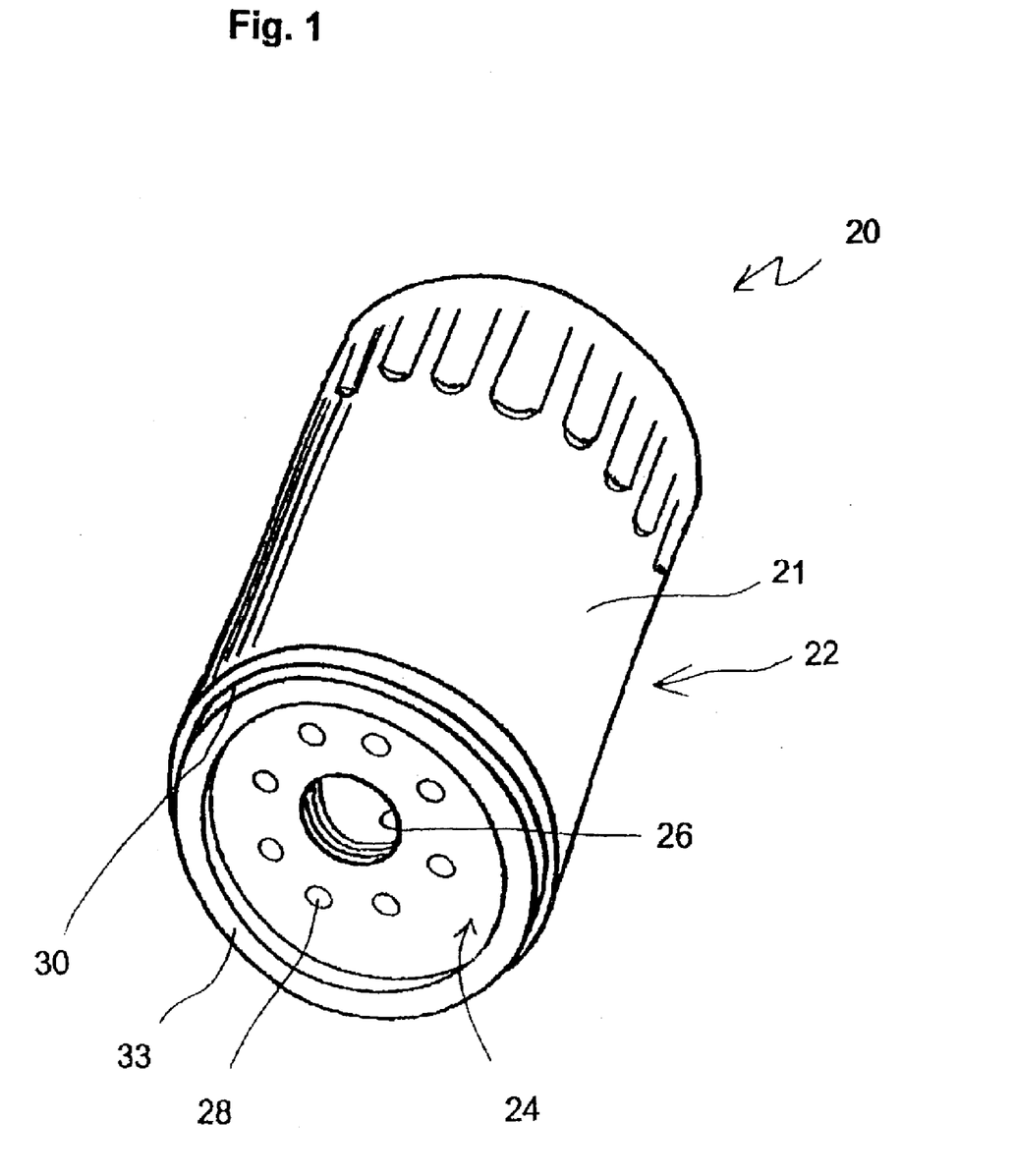
FIG. 1 is a perspective view of an oil filter in accordance with a first embodiment of the present invention.
Figure 2A:
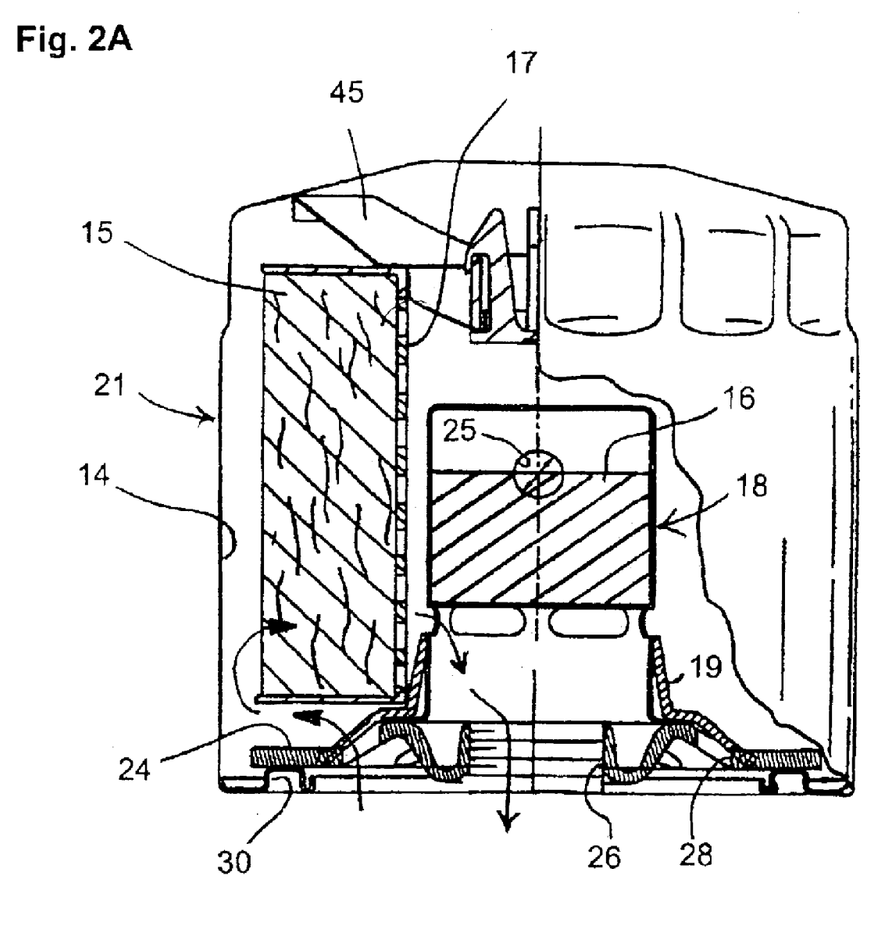
FIG. 2A is a side plan view of a first variation of the oil filter of FIG. 1, partially cut away and partially shown in cross-section, wherein a hollow additive cartridge contains a solid block of an additive composition.

Referring to FIGS. 1 and 2A, there is shown an oil filter 20 according to a first preferred embodiment of this invention. The direction of oil flow, through the filter 20, is shown by the arrows in FIG. 2A, which illustrate a flow path through the filter.

The oil filter 20 generally includes a hollow cylindrical housing 22 which defines a hollow chamber 14 therein, a porous, mechanical filter element 15 within that chamber, and a centrally located additive cartridge 18, also retained inside the housing chamber 14.

The housing 22 includes a hollow, generally cylindrical case 21, and a base plate 24 sealingly attached to the case.

A foraminous center tube 17 may, optionally, be provided within the filter housing 22 to supportively reinforce the mechanical filter element 15 thereon.

An anti-drainback valve 19 is provided inside the filter housing 22, at the base of the center tube 17, to keep oil in the filter 20 during engine shutoff, when the filter is mounted in the orientation shown in FIG. 2. The oil filter 20 may incorporate a spring-loaded pressure relief valve of a type known to those in the art. A retainer 45 may be provided above the center tube 17, to exert a downward pressure thereon.

The housing base plate 24 includes a plurality of inlet ports 28 formed therethrough and arranged in a circular pattern. The base plate 24 also includes a central outlet port 26. The outlet port 26 has a plurality of female threads formed therein, to allow rotatable mounting of the filter 20 on an externally threaded hollow tubular fitting on an engine block (not shown). An annular external seal or gasket 33 (FIG. 1) fits engagingly into a groove 30 formed at the bottom surface of the base plate, to resist oil leakage outwardly from the base of the filter.

Figure 2B:
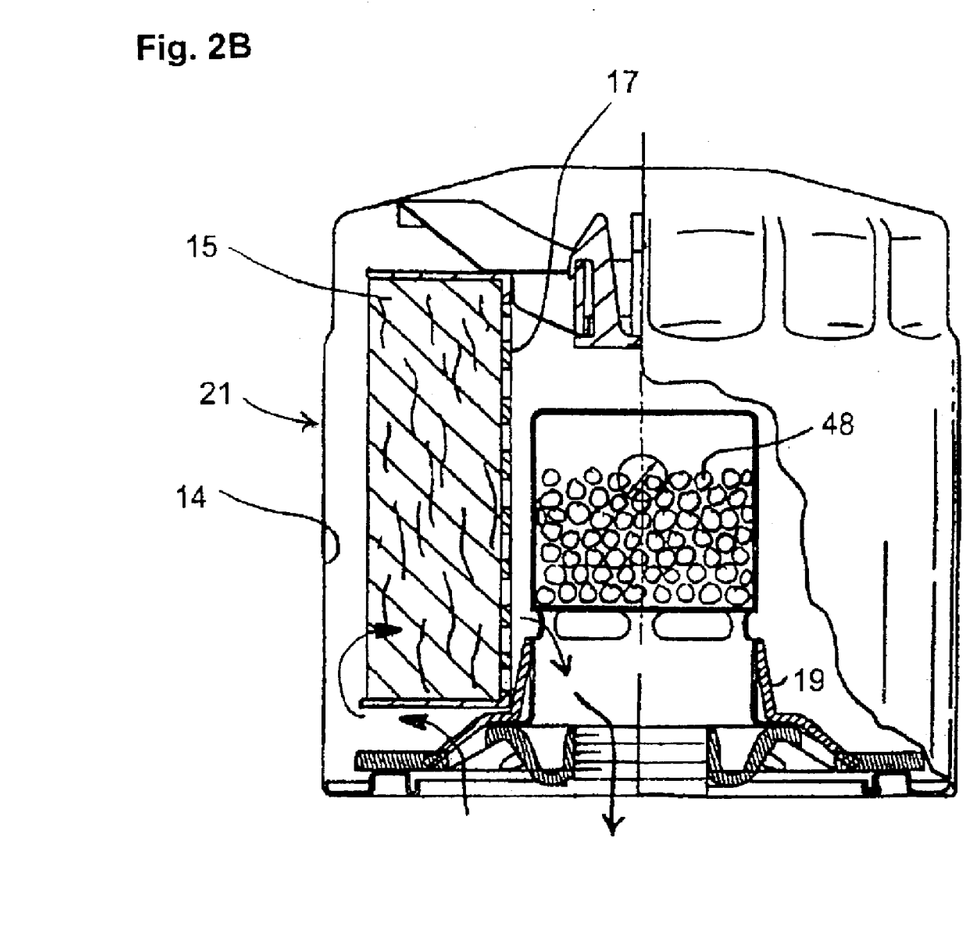
FIG. 2B is a side plan view a second variation of the oil filter of FIG. 1, partially cut away and partially shown in cross-section, wherein a hollow additive cartridge contains a plurality of pellets formed of an additive composition.

In the depicted embodiment of FIGS. 1–2, the mechanical filter element 15 includes a conventional cylindrical member made of accordion-pleated filter paper.

The Additive Cartridge—First Embodiment

Further in the embodiment of FIGS. 1–2A and 3–5, the filter 20 contains an additive cartridge 18 disposed centrally and coaxially inside of the center tube 17, in the middle of the mechanical filter element 15. The additive cartridge 18 includes a hollow cartridge shell 35, provided in a generally cylindrical shape, closed at the top and open at the bottom thereof in the orientation shown. The additive cartridge 18 also includes a solid additive composition 16 inside of the cartridge shell 35.

Figure 3:
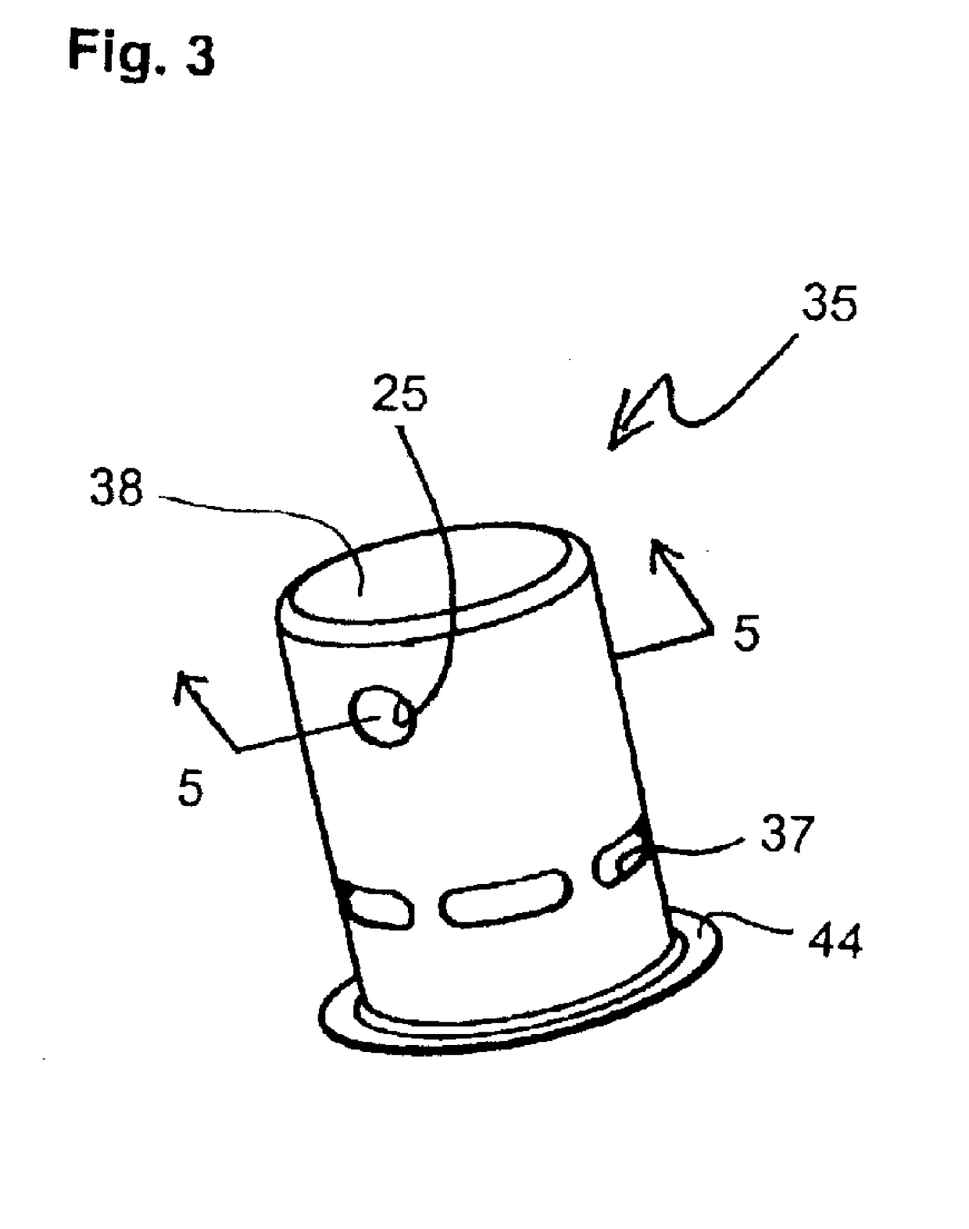
FIG. 3 is a perspective view of an additive cartridge, which is a component of the oil filters of FIGS. 1, 2A and 2B.
Figure 4:
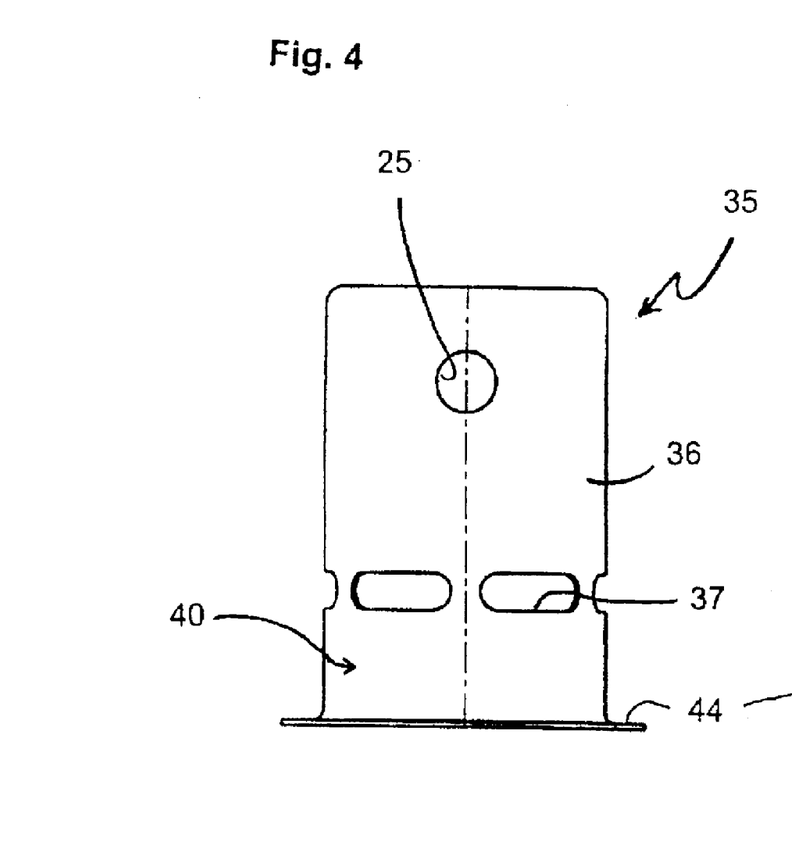
FIG. 4 is a side plan view of the additive cartridge of FIG. 3.
Figure 5:
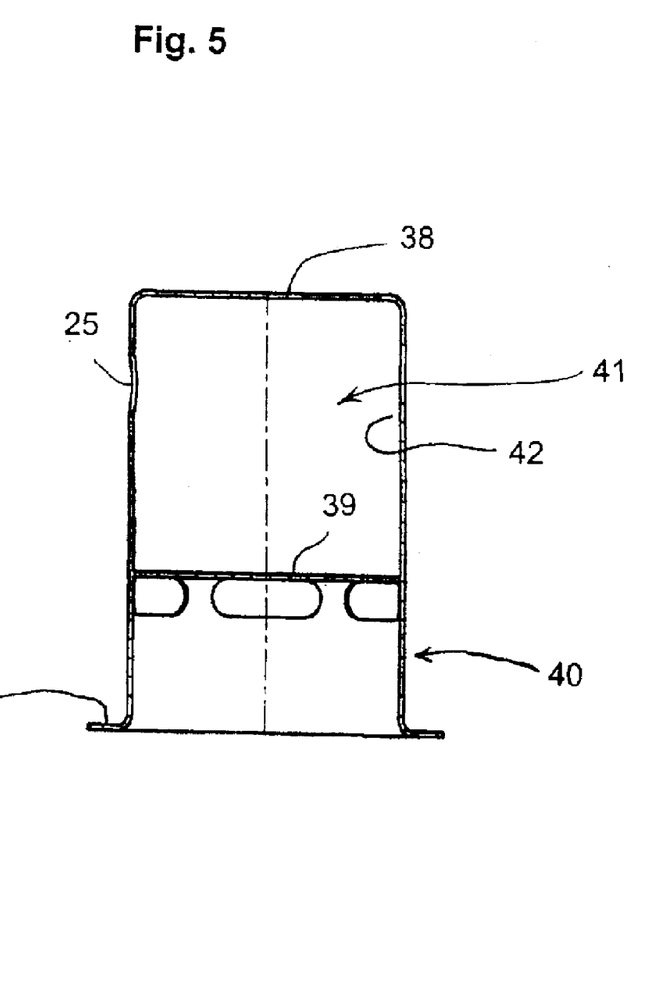
FIG. 5 is a cross-sectional view of the additive cartridge of FIGS. 3 and 4, taken along the line 5—5 in FIG. 3.

The hollow cartridge shell 35 has a cylindrical side wall 36 with a plurality of apertures 37 formed in a lower portion thereof. The cartridge shell 35 also includes a cap 38, which covers the top of the side wall 36 and is integrally formed therewith.

As seen in the cross-sectional view of FIG. 5, the cartridge shell 35 also includes a horizontal dividing wall 39 extending across a part of the side wall 36 above the apertures 37. The dividing wall 39 subdivides the shell 35 into two sections, a lower baffle portion 40 and an upper dispenser housing 41 containing a hollow storage chamber 42 therein.

The cartridge shell 35 has at least one opening 25 formed therethrough to allow fluid communication between the storage chamber 42 and the exterior of the cartridge. The opening(s) may be formed in the side wall 36, the cap 38, and/or the dividing wall 39. The number and size of the opening(s) 25 may be selected to control the rate of dissolution of the additive material 16 from the dispenser housing 41 for a particular application.

In the embodiment of FIGS. 2–5, the additive cartridge 35 also has a horizontal flange 44 extending transversely outwardly from the side wall 36 at the base of the baffle 40. The flange 44 may be included to cooperate with the anti-drainback valve 19, to help seal against fluid bypassing the mechanical filter 15 under normal operation conditions.

In the practice of the present invention, the additive cartridge 18 is preferred to be located in the flow path downstream of the mechanical filter element 15, in order to allow the beneficial additive composition thereof to be released into the oil on the clean side of the filter element, after mechanical filtration has been achieved.

The Additive Composition

The additive cartridge 18 contains a beneficial additive composition therein, which may be a solid block 16, as shown in FIG. 2A. In other words, the additive composition 16 may be solid at standard temperature and pressure, defined as 25 degrees C. and one atmosphere pressure.

The additive composition 16 may be injected into the cartridge shell 35 in a hot liquid state, and allowed to solidify as it cools. Alternatively, the additive composition 16 may be added in powdered form, or may be dispersed in a grease or wax. The additive composition 16 is preferred to be at least partially soluble in hot engine oil.

The additive composition 16 includes one or more additives which may be selected from the group including basic conditioners, corrosion inhibitors, metal deactivators, antioxidants, dispersants, friction modifiers, oil stabilizers, pour point depressants, detergents, viscosity index improvers, anti-wear agents, extreme pressure additives, mixtures of the above additives, and/or other known beneficial additives.

The basic conditioner of the additive cartridge, where used, is preferably a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

The material selected for the cartridge shell 35 is preferred to be a material which remains stable in a hot oil environment. Preferred materials are metals such as steel and oil-tolerant plastics such as, e.g., polyacetals. The cartridge 18 allows the beneficial additive composition 16 to be slowly released into the oil, thereby conditioning the oil in a metered manner over time.

Alternatively, as shown in FIG. 2B, the concentrated additive composition in the cartridge 18 may be provided as a plurality of separate individual pellets 48, in order to provide greater surface area than is afforded with the solid additive block 16 of FIG. 2A.

Where pellets 48 are used, they may be disassociated and separate from one another.

Alternatively, the individual additive-dispensing pellets 48 housed within the cartridge shell 35 may be bonded together or otherwise cohesively associated with one another to form a substantially integral, yet highly porous structure capable of independent self-support. Where the pellets 48 are joined together in this way, the cartridge shell 35 is not required, and may be omitted if desired.

During use, as hot oil slowly flows past and around the cartridge 18, some of the oil enters the dispenser housing 41 via the opening 25, causing a small amount of the beneficial additive 16 to pass outwardly from the dispenser housing, and to mix with the oil. Where used, the basic salt component of the additive 16 acts to counteract and neutralize acidic combustion products. This neutralization of acidic combustion products allows for a much longer useful life of some other oil additives such as, for example, dispersants and zinc dialkyldithiophosphate (ZDP), which are provided in the oil by the manufacturer thereof. This, in turn, allows for greater intervals between oil changes than is possible without the chemically active filter element.

The Additive Cartridge—Second Embodiment

Figure 6:
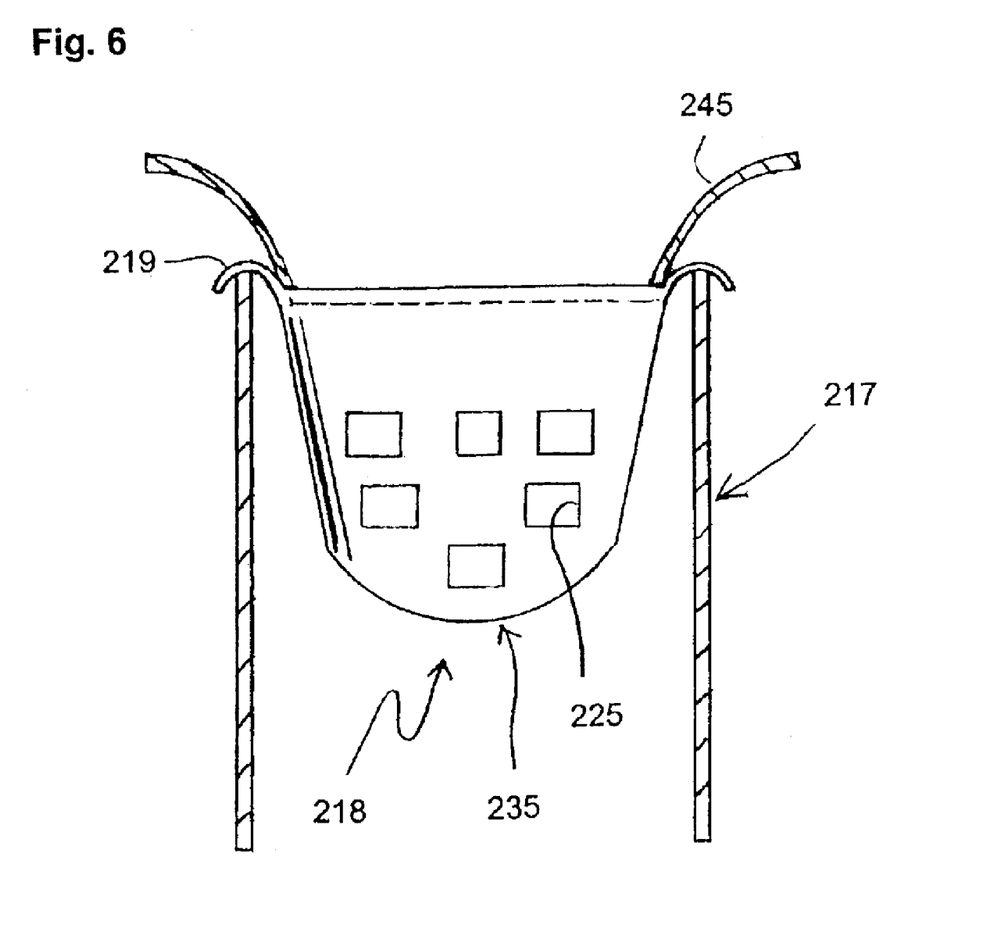
FIG. 6 is a side plan view, partially in cross section, of an alternative additive cartridge in accordance with a second embodiment of the invention, wherein the cartridge takes the general form of a basket.

Referring now to FIG. 6, an additive cartridge 218 in accordance with a second embodiment of the invention is shown. Unless specified or depicted as being different herein, the additive cartridge 218 is substantially similar to the additive cartridge 18 as previously described. Those in the art will understand that the additive cartridge 218 of FIG. 6 may be substituted into the oil filter 20 of FIG. 2A instead of the additive cartridge 18 thereof, located above the center tube as indicated by FIG. 6.

Figure 7:
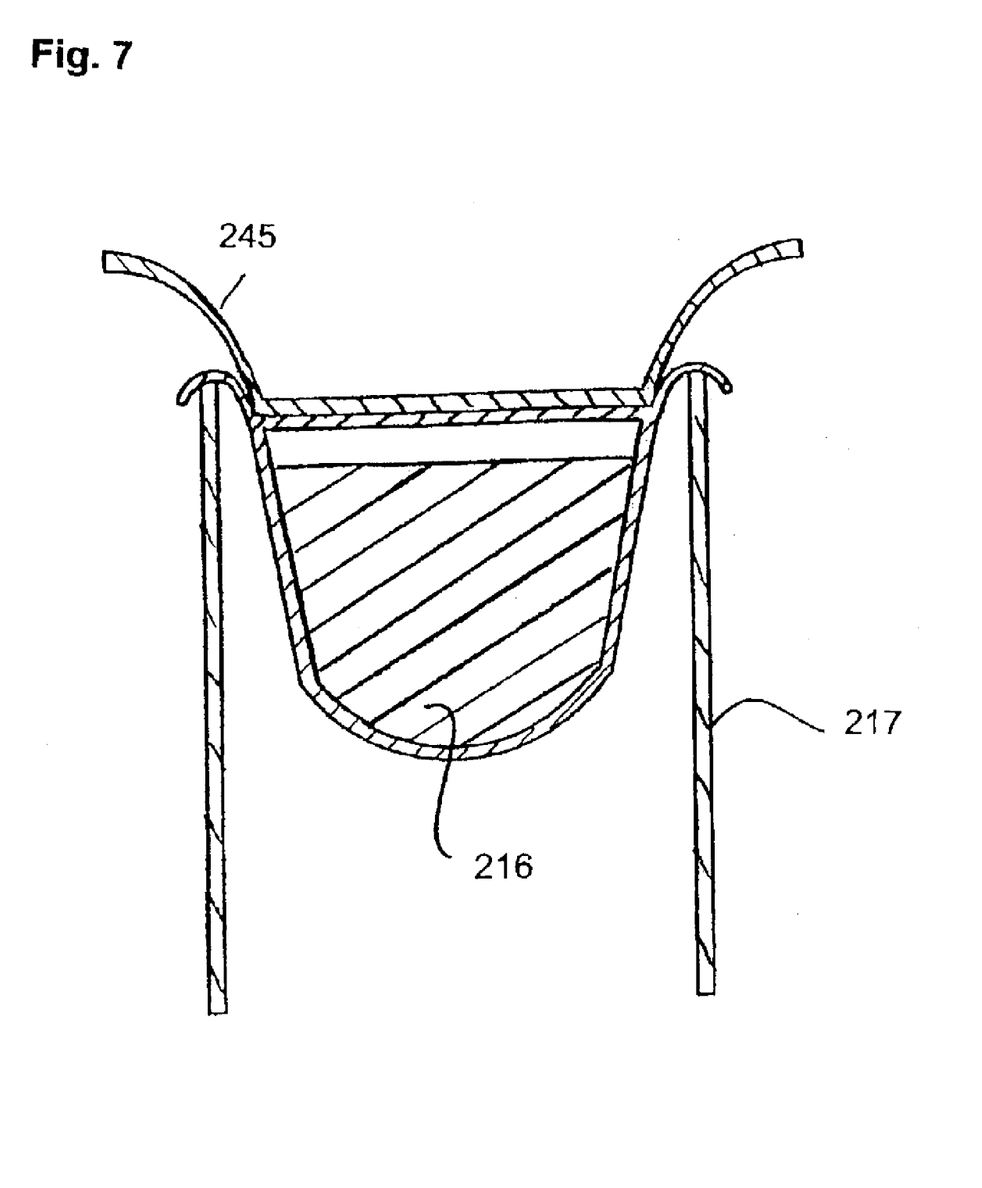
FIG. 7 is a cross-sectional view of the cartridge of FIG. 6, showing a solid additive concentrate therein.

The cartridge 218 in this embodiment includes a hollow cartridge shell 235 in the form of a basket. The shell 235 is either supported by or otherwise attached to the center tube 217. While the center tube 217 is shown in simplified form in the drawings, it will be understood that it is a porous member. The shell 235 may include a top flange 219 for connecting to the center tube. The shell 235 has a recessed space formed in the top thereof for supportively receiving a retainer spring 245. The shell 235 also has one or more openings 225 formed therein to allow fluid communication with between the interior thereof and the space surrounding the shell. A solid additive concentrate 216 is provided inside of the shell 235, in a manner similar to that described above for the first embodiment. The additive may be in one piece or may be pelletized.

The Additive Cartridge—Third Embodiment

Figure 8:
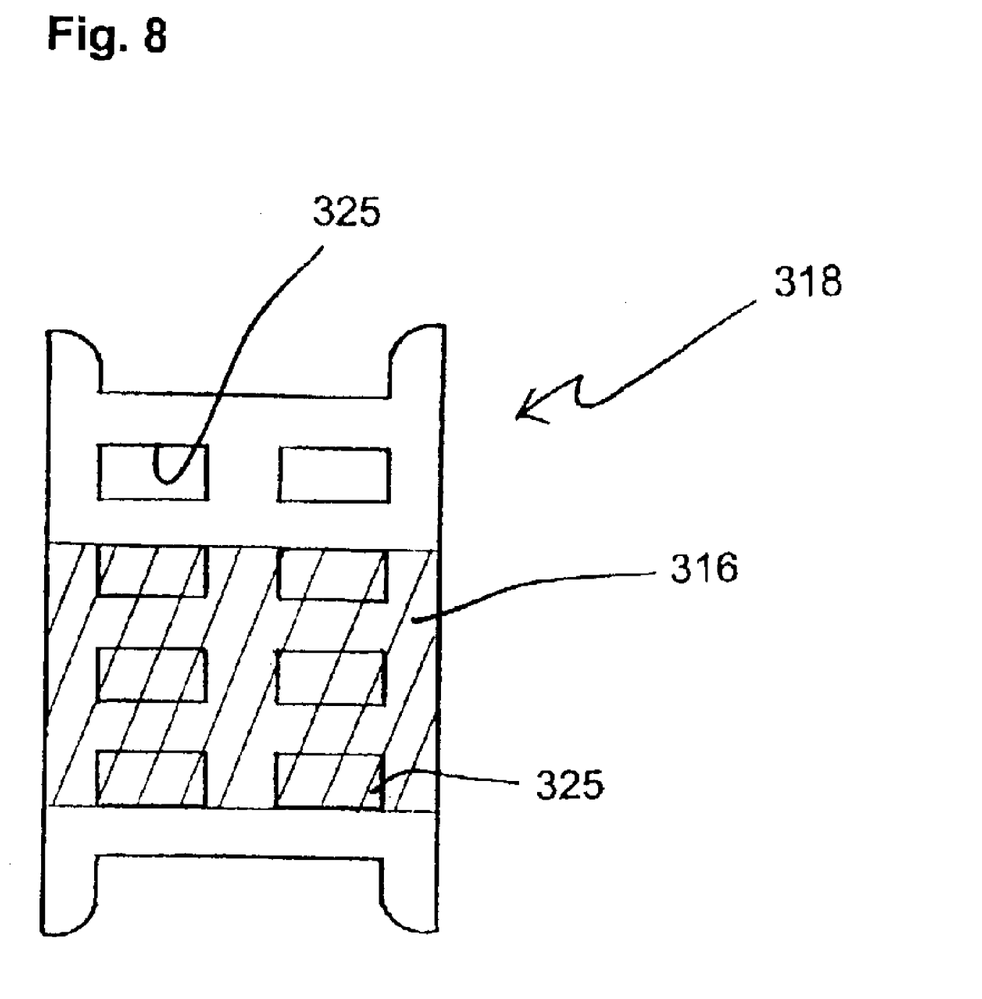
FIG. 8 is a side plan view of another alternative additive cartridge in accordance with a third embodiment of the invention, wherein the cartridge takes the general form of a hollow center tube with an additive composition contained therein.

Referring now to FIG. 8, an additive cartridge 318 in accordance with a third embodiment of the invention is shown. Unless specified or depicted as being different herein, the additive cartridge 318 is substantially similar to the additive cartridge 18 as previously described. Those in the art will understand that the additive cartridge 318 of FIG. 8 may be substituted into the oil filter 20 of FIG. 2A instead of the additive cartridge 18 and center tube 17 thereof.

The cartridge 318 in this embodiment is a modified center tube. In the embodiment of FIGS. 6–7, the cartridge 318 includes a hollow cylindrical shell 335 with a solid additive 316 contained therein. The shell 235 also has one or more openings 325 formed therein to allow fluid communication with between the interior thereof and the space surrounding the shell. A solid additive concentrate 316 is provided inside of the shell 235, in a manner similar to that described above for the first embodiment. The additive may be in one piece or may be pelletized.

Although the present invention has been described herein with respect to a number of preferred embodiments thereof, the foregoing description is intended to be illustrative, and not restrictive. Those skilled in the art will realize that many modifications of the preferred embodiments could be made which would be operable. All such modifications, which are within the scope of the claims, are intended to be within the scope and spirit of the present invention.

Having, thus, described the invention, what is claimed is:

1. An oil filter, comprising:
   a housing having an inlet and an outlet defining a flow path through a chamber defined by said housing;
   a mechanical filter element disposed inside the filter housing in the flow path, a substantially cylindrical center tube located coaxially within the mechanical filter element; and
   an additive cartridge in the filter housing with at least part of the additive cartridge disposed inside the center tube, said additive cartridge comprising:
      a dispenser housing which is a hollow shell defining an additive storage chamber therein, said dispenser housing having at least one hole formed therein and a flange portion depending therefrom for supporting the dispenser housing within said mechanical filter; and
      an oil additive composition disposed within said additive storage chamber, wherein said dispenser housing defines a first flow path and a second flow path, said first flow path being adjacent to said inlet and said second flow path providing fluid communication to said additive storage chamber and said oil additive composition disposed therein, wherein said dispenser housing further comprises a dividing wall separating said first flow path from said second flow path.

2. The oil filter of claim 1, wherein the additive composition comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

3. The oil filter of claim 2, wherein the additive composition comprises a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

4. The oil filter of claim 1, wherein the additive cartridge is located substantially centrally in the filter housing.

5. The oil filter of claim 1, wherein said flange portion supports said dispenser housing at a first end of said housing; and said housing further comprises a base plate disposed at said first end, said base plate comprising a plurality of inlet ports and an outlet port for defining said inlet and said outlet of said housing.

6. The oil filter of claim 1, wherein said flange portion supports said dispenser housing at a first end of said housing; and said housing further comprises a base plate disposed at said first end, said base plate comprising a plurality of inlet ports and an outlet port for defining said inlet and said outlet of said housing and said flange portion is disposed between said base plate an anti-drainback valve for selectively blocking said plurality of inlet ports.

7. An oil filter, comprising:
   a housing having an inlet and an outlet defining a flow path through a chamber defined by said housing;
   a mechanically active filter element disposed inside the filter housing in the flow path; and
   an additive cartridge disposed inside the filter housing inside of the mechanically active filter element, said additive cartridge comprising:
      a dispenser housing which is a hollow shell defining an additive storage chamber therein, said dispenser housing having at least one hole formed therein and a flange portion depending therefrom for supporting the dispenser housing within said mechanically active filter element; and
      an oil additive composition disposed within said additive storage chamber, wherein said dispenser housing defines a first flow path and a second flow path, said first flow path being adjacent to said inlet and said second flow path providing fluid communication to said additive storage chamber and said oil additive composition disposed therein, wherein said dispenser housing further comprises a dividing wall separating said first flow path from said second flow path.

8. The oil filter of claim 7, wherein the additive composition comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

9. The oil filter of claim 7, wherein the additive composition comprises a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

10. The oil filter of claim 7, wherein the additive cartridge comprises a cylindrical tube having at least one opening formed therein.

11. The oil filter of claim 7, wherein said flange portion supports said dispenser housing at a first end of said housing; and said housing further comprises a base plate disposed at said first end, said base plate comprising a plurality of inlet ports and an outlet port for defining said inlet and said outlet of said housing.

12. The oil filter of claim 7, wherein said flange portion supports said dispenser housing at a first end of said housing;

and said housing further comprises a base plate disposed at said first end, said base plate comprising a plurality of inlet ports and an outlet port for defining said inlet and said outlet of said housing and said flange portion is disposed between said base plate an anti-drainback valve for selectively blocking said plurality of inlet ports.

13. An oil filter for filtering oil, comprising:
a housing having an inlet and an outlet defining a flow path through a chamber defined by said housing;
a mechanically active filter element disposed inside the filter housing in the flow path; and
an additive cartridge disposed inside the filter housing and being positioned in the flow path to receive fluids that have passed through said mechanically active filter element, said additive cartridge comprising:
a baffle portion positioned in said flow path between said mechanically active filter member and said outlet;
a dispenser housing which is a hollow shell defining an additive storage chamber therein, said dispenser housing having at least one hole formed therein, said dispenser housing being operatively attached to said baffle portion and including an additive storage chamber positioned proximate to said baffle portion;
a flange portion for supporting said additive cartridge within said mechanically active filter element, said flange portion extending from said baffle portion; and
an oil additive composition disposed within said additive storage chamber; wherein said baffle portion creates another flow path that permits at least some of the oil being filtered by the oil filter to pass said additive cartridge without being routed through said additive storage chamber.

14. The oil filter of claim 13, wherein the additive cartridge is located substantially centrally in the filter housing.

15. The oil filter of claim 13, wherein the additive composition comprises at least one additive selected from the group consisting of basic conditioners, corrosion inhibitors, metal deactivators, axitioxidants, dispersants, friction modifiers, oil stabilizers, pour point depressants, detergents, viscosity index improvers, anti-wear agents, extreme pressure additives, and mixtures thereof.

16. An additive cartridge for an oil filter, comprising:
a cartridge housing having a side wall defining a periphery of a first chamber and a second chamber and a dividing wall extending from said side wall to define said first chamber and said second chamber within said cartridge housing;
a plurality of first apertures formed in said side wall to provide fluid communication to said first chamber;
a plurality of second apertures formed in said side wall to provide fluid communication to said second chamber;
an outlet opening disposed on one end of said additive cartridge, said outlet opening providing fluid communication into said first chamber;
a flange portion depending away from said outlet opening;
a beneficial additive composition stored within said second chamber;
wherein said first chamber provides a baffle for fluids passing through said additive cartridge and said plurality of second apertures allow said beneficial additive to be in fluid communication with fluids that have passed by said baffle.

17. The additive cartridge as in claim 16, wherein said side wall defines a cylinder and said dividing wall extends completely across a diameter of said cylinder.

18. The additive cartridge as in claim 17, wherein said flange portion provides a cylindrical surface that depends away from said side wall.

* * * * *